United States Patent [19]

Lasdon et al.

[11] Patent Number: 4,828,868

[45] Date of Patent: May 9, 1989

[54] LOW CALORIE PEANUT SPREAD

[75] Inventors: Lloyd Lasdon, New York, N.Y.;
Harvey Krohn, Westfield, N.J.;
Stuart Lasdon, Salt Point, N.Y.

[73] Assignee: Elescon, Inc., New York, N.Y.

[21] Appl. No.: 35,634

[22] Filed: Apr. 7, 1987

[51] Int. Cl.$^4$ ............................ A23L 1/38; A23L 1/20
[52] U.S. Cl. .................................... 426/633; 426/632;
426/457
[58] Field of Search ........................ 426/632, 633, 457

[56] References Cited

U.S. PATENT DOCUMENTS

| | | | |
|---|---|---|---|
| 3,689,287 | 9/1972 | Mitchell | 426/457 |
| 3,800,056 | 3/1974 | Mitchell | 426/632 |
| 4,113,889 | 9/1978 | Baxley | 426/632 |

FOREIGN PATENT DOCUMENTS 0063174  4/1984  Japan ................................. 426/632

OTHER PUBLICATIONS

Harris et al. Development and Use of Defatted Peanut flour, Meals, and Grits Bulletin 431, Apr. 1972. Agriculture Experiment Station, Auburn University, Auburn, Ala., pp. 33 and 34.

Primary Examiner—Donald E. Czaja
Assistant Examiner—Helen Pratt
Attorney, Agent, or Firm—Kenyon & Kenyon

[57] ABSTRACT

A low calorie, low fat peanut butter like product and a method for making the same is disclosed. Unroasted, defatted peanut flour is milled in water to a smooth, free-flowing consistency and then cooked at a temperature of at least 175° F. but below the boiling point of the water/flour mixture. The resulting product has a water content of 45 to 55 percent and a fat content of from 1-25%.

8 Claims, No Drawings

LOW CALORIE PEANUT SPREAD

BACKGROUND OF THE INVENTION

This invention relates to the production of food products from peanuts. Specifically, this invention relates to the production of high quality, low calorie, low fat peanut butter-like spreads having a rich roast peanut taste. Peanut butter is one of the most popular foods in the American diet and is much prized for its strong flavor and unique texture. While peanut butter is a generally healthful food, many regard it as too rich in fats and calories. Peanut butter typically contains about 50% fat and has about 600 calories per 100 grams.

Some work has been done on the creation of low-calorie reduced fat whole peanut and peanut flour products. Reduction in caloric content has been achieved by the partial removal of fats from these whole peanuts and peanut flours at the expense of certain desirable properties. For example the reduced fat content peanut flours described in U.S. Pat. Nos. 4,113,599 and 3,947,599 have lost their peanut flavor characteristics and are very bland, almost tasteless. These products are furthermore described as base protein materials which can be used in the production of other food products; none are described as possible base materials for the production of peanut spreads or low calorie, low fat peanut butters. The peanut flours described in these patents, in addition to having bland taste, are generally dry, having water contents of under 5%.

The addition of water to roast peanut products or to peanut products that are to have roast peanut flavor heretofore has been prevented by the occurrence of severe flavor degradation and prohibitively shortened shelf life.

Existing processes for the production of low calorie peanut products that have roast peanut flavor call for roasting temperatures of 300° F. or higher.

OBJECTS OF THE INVENTION

It is an object of this invention to provide a process for the production of a low calorie, peanut butter-like spread that has a reduced fat content.

It is also an object of the invention to provide a process for the production of a low calorie and low fat peanut spread that is not bland to the taste, that has a desireable roast peanut flavor characteristic.

It is yet another object of this invention to provide a process for the production of a low calorie peanut spread that contains a high water content and a texture that nearly approximates that of generic peanut butter.

It is a further object of this invention to provide for the production of a low calorie, low fat peanut butter-like spread that is refrigerated to achieve extended shelf life.

It is a further object of the present invention to produce a low calorie, low fat peanut butter-like spread through the utilization of unroasted and defatted peanut flour which exhibits the characteristic of absorbing water without degrading in flavor.

SUMMARY OF THE INVENTION

According to this invention a delicious low calorie, low fat peanut butter-like spread is produced by milling unroasted, defatted peanut flour in water. The flour is ground to a smooth free-flowing consistency having a maximum particle size of about 150$\mu$. The flour is then cooked at a temperature of at least 175° F. but less than the boiling point of the water/flour mixture. This upper point is slightly higher than 212° F. due to the colligative properties of the solute. The resulting product has a water content of from 45-55 percent and a fat content of from 1-25%. It has a peanut flavor characteristic and can be eaten "as is" or enhanced with seasonings, flavorings or the like to develop its peanut butter-like flavor (roast peanut) qualities.

DETAILED DESCRIPTION OF THE INVENTION

The defatted, unroasted peanut flour which is used in the present invention may be any of several such commercially available flours. Defatted flours may have as little as 1% to 35% fat. A typical commercially available defatted peanut flour will have an analysis of about 40% protein, 30% fat, 2.5% fiber, 19% carbohydrates and the balance water.

The peanut flour is mixed with water in ratios from 1:1 to 1:3 by weight and then fed into a suitable mill. The milling operation results in a product having a particle size less than 150$\mu$ with a preferable maximum particle size of 75$\mu$.

Upon completion of the milling step the mixture is cooked at a temperature of at least 175° F. but no higher than the boiling point of the mixture. The cooking step should last from 35 to 75 minutes and preferably last 40 to 50 minutes. The purpose of this cooking process is to achieve a peanut butter-like texture and the elimination of certain undesirable raw peanut flavors. The endpoint of the cooking process is demonstrated by a flavor objective which is a pleasant peanut like flavor characteristic. Overcooking, in terms of time or temperature, results in denaturation and loss of flavor qualities.

The milled product is removed from the cooker, cooled to a minimum about 170° F. and filled into suitable jars. At this stage it has a desirable peanut taste characteristic, as well as a water content of about 50% and a texture similar to that of peanut butter. It also has a greatly reduced fat content (as much as 80-95%). It requires refrigeration for extended shelf life.

The cooking step can include at least some of the time spent in the mill. That is to say, the milling and cooking steps may overlap.

Colorings, seasonings, preservatives, flavorings and the like may be used to enhance the product of this invention.

The inventors have found that the following is a suitable formula to achieve a final product that exhibits the desirable properties of the present invention.

TABLE I

| INGREDIENT | AMOUNT |
| --- | --- |
| Peanut Flour | 9.00 lbs. |
| Water | 13.50 lbs. |
| Corn Syrup | 6.75 lbs. |
| Molasses | 1.875 ozs. |
| Xanthan Gum | 0.57 ozs. |
| Lecithin | 0.86 ozs. |
| Sugar | 12.00 ozs. |
| Salt | 6.75 ozs. |
| Coloring | 0.93 ozs. |
| Potassium sorbate | 0.54 ozs. |
| Flavorings | 2.40 ozs. |

Many variations and modifications of the product and process of the present invention will be suggested to one of ordinary skill in the art upon a reading of the specific embodiments which are described in this specification. The scope of this invention is, however, not limited to the specific embodiments described herein. The present invention is defined and limited only by the claims which conclude this specification.

We claim:

1. A process for the production of a peanut butter product having a low fat and caloric content comprising the steps of:
    milling defatted, unroasted peanut flour having no more than about 35% fat by weight in the presence of water to a maximum particle size of about 150µ and,
    cooking the mixture of water and peanut flour at a temperature of between about 175° F. and the boiling point of a mixture of peanut flour and water.

2. The process of claim 1 wherein the peanut flour is milled to a maximum particle size of about 75µ.

3. The process of claim 1 wherein the peanut flour is cooked for 35 to 75 minutes.

4. The process of claim 3 wherein the peanut flour is cooked at a temperature of between about 200° F. and 215° F.

5. The peanut butter product produced by the process comprising the steps of:
    milling defatted, unroasted peanut flour having no more than about 35% fat by weight in the presence of water to a maximum particle size of about 150µ and,
    cooking the mixture of water and peanut flour at a temperature of between about 175° F. and the boiling point of a mixture of peanut flour and water.

6. The product of claim 5 wherein the peanut flour is milled to a maximum particle size of about 75µ.

7. The product of claim 5 wherein the peanut flour is cooked for 35 to 75 minutes.

8. The product of claim 7 wherein the peanut flour is cooked at a temperature of between about 200° F. and 215° F.

* * * * *